(12) United States Patent
Ban et al.

(10) Patent No.: US 12,086,305 B2
(45) Date of Patent: Sep. 10, 2024

(54) DISPLAY METHOD AND ELECTRONIC DEVICE COMPRISING SELECTING AND OBTAINING IMAGE DATA OF A LOCAL AREA OF A USER'S FACE

(71) Applicant: Lenovo (Beijing) Co., Ltd., Beijing (CN)

(72) Inventors: Xueli Ban, Beijing (CN); Qihua Xiao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 429 days.

(21) Appl. No.: 17/139,549

(22) Filed: Dec. 31, 2020

(65) Prior Publication Data

US 2021/0200304 A1 Jul. 1, 2021

(30) Foreign Application Priority Data

Dec. 31, 2019 (CN) .......................... 201911405105.4

(51) Int. Cl.
*G06F 3/01* (2006.01)
*G06T 7/73* (2017.01)
*G06T 11/00* (2006.01)
*G06V 40/16* (2022.01)

(52) U.S. Cl.
CPC ................ *G06F 3/012* (2013.01); *G06T 7/73* (2017.01); *G06T 11/00* (2013.01); *G06V 40/168* (2022.01); *G06T 2207/30201* (2013.01)

(58) Field of Classification Search
CPC . G06F 3/012; G06T 7/73; G06T 11/00; G06T 2207/30201; G06V 40/168
See application file for complete search history.

(56) References Cited

U.S. PATENT DOCUMENTS

| | | | | |
|---|---|---|---|---|
| 5,065,347 A | * | 11/1991 | Pajak .................... | G06F 3/0481 715/776 |
| 2012/0212436 A1 | * | 8/2012 | Kobayashi ............ | G06F 1/1641 345/1.3 |
| 2013/0212520 A1 | * | 8/2013 | Kim ........................ | G06T 11/60 715/781 |
| 2015/0012879 A1 | * | 1/2015 | Kim ...................... | G06F 3/0481 715/788 |
| 2016/0142624 A1 | | 5/2016 | Niigaki | |
| 2018/0139405 A1 | * | 5/2018 | Baek ..................... | H04N 21/84 |

(Continued)

FOREIGN PATENT DOCUMENTS

| | | |
|---|---|---|
| CN | 105009124 A | 10/2015 |
| CN | 106942878 A | 7/2017 |

(Continued)

*Primary Examiner* — Benjamin C Lee
*Assistant Examiner* — Nathan P Brittingham
(74) *Attorney, Agent, or Firm* — ANOVA LAW GROUP, PLLC

(57) ABSTRACT

The present disclosure provides a display method. The display method includes obtaining a selection operation of a user's face; obtaining image data of a local area of the user's face corresponding to the selection operation; determining a target position at a display area for displaying the image data of the local area; and displaying the image data of the local area at the target position. When the user looks at the target position relative to other positions at the display area, the local area of the user's face is close to a main optical axis of a photographing unit.

20 Claims, 16 Drawing Sheets

(56) References Cited

U.S. PATENT DOCUMENTS

2018/0181261 A1* 6/2018 Saurabh ................. G06F 9/451
2021/0192703 A1* 6/2021 Wang ................... G06V 40/171

FOREIGN PATENT DOCUMENTS

| CN | 107771314 A | 3/2018 | | |
|---|---|---|---|---|
| CN | 108932487 A | 12/2018 | | |
| CN | 109298844 A | 2/2019 | | |
| WO | WO-9429788 A1 * | 12/1994 | ......... | G06F 3/04842 |
| WO | WO-2020108291 A1 * | 6/2020 | ......... | G06K 9/00281 |

\* cited by examiner

DISPLAY METHOD AND ELECTRONIC DEVICE COMPRISING SELECTING AND OBTAINING IMAGE DATA OF A LOCAL AREA OF A USER'S FACE

CROSS-REFERENCES TO RELATED APPLICATIONS

This application claims priority of Chinese Patent Application No. 201911405105.4 filed on Dec. 31, 2019, the entire contents of which are hereby incorporated by reference.

FIELD OF THE DISCLOSURE

The present disclosure generally relates to the field of image processing technologies and, more particularly, relates to display methods and electronic devices.

BACKGROUND

A display area of an electronic device can display image data of a local area of a user's face while displaying the user's face. However, distortion may happen in this simultaneous display mode when the user looks at the image data of the local area of the user's face that is independently displayed.

BRIEF SUMMARY OF THE DISCLOSURE

One aspect of the present disclosure provides a display method. The display method includes obtaining a selection operation of a user's face; obtaining image data of a local area of the user's face corresponding to the selection operation; determining a target position at a display area for displaying the image data of the local area; and displaying the image data of the local area at the target position. When the user looks at the target position relative to other positions at the display area, the local area of the user's face is close to a main optical axis of a photographing unit.

Another aspect of the present disclosure provides an electronic device including a photographing unit, a display screen, and a processor. The processor is configured to obtain a selection operation of a user's face; obtain an image of a local area of the user's face corresponding to the selection operation; obtain image data of the local area of the user's face; determine a target position at a display area of the display screen for displaying the image data of the local area; and display the image data of the local area at the target position, wherein when the user looks at the target position relative to other positions at the display area, the local area of the user's face is close to a main optical axis of a photographing unit.

Another aspect of the present disclosure provides a computer readable medium containing program instructions for displaying images. The execution of the program instructions by one or more processors of a computer system causes the one or more processors to carry out the steps of: obtaining a selection operation of a user's face; obtaining image data of a local area of the user's face corresponding to the selection operation; determining a target position at a display area for displaying the image data of the local area; and displaying the image data of the local area at the target position. When the user looks at the target position relative to other positions at the display area, the local area of the user's face is close to a main optical axis of a photographing unit.

Other aspects of the present disclosure can be understood by those skilled in the art in light of the description, the claims, and the drawings of the present disclosure.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts.

DETAILED DESCRIPTION

Figure 1:
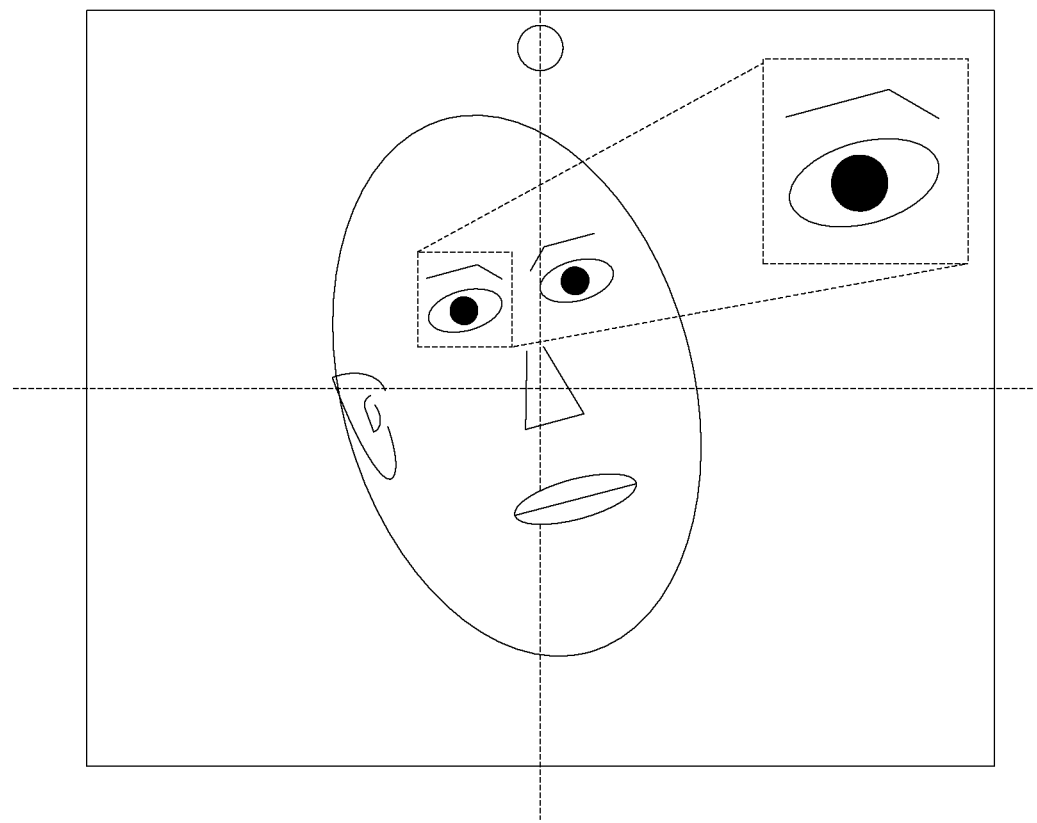
FIG. 1 is a schematic diagram of an existing display.

At present, a display area of an electronic device can display image data of a local area of a user's face while displaying the user's face. A preset area can be determined in the display area, and the image data of the local area can be independently displayed in the preset area. A fixed position of the display area is used to display independently, as shown in FIG. 1, image data of a local area is displayed at the upper right of the display area. When the image data of the user's left eye is displayed at the upper right, a local area of the user's face is as shown in FIG. 1. If the local area of the user's face is farther away from a main optical axis of a photographing unit, there will be a greater chance to have distortion.

Therefore, a display method is provided according to the present disclosure. In a process of simultaneously displaying the user's face and the image data of a certain local area in the display area, when the user looks at the location of the image data of the local area displayed independently, the local area of the user's face is close to the main optical axis of the photographing unit to reduce the chance of having distortion.

The technical solutions in the example embodiments of the present disclosure will be described clearly with reference to the accompanying drawings. The described embodiments are only some of the embodiments of the present disclosure, rather than all the embodiments. Based on the embodiments of the present disclosure, all other embodiments obtained by a person of ordinary skill in the art without creative efforts shall fall within the scope of the present disclosure.

Figure 2:
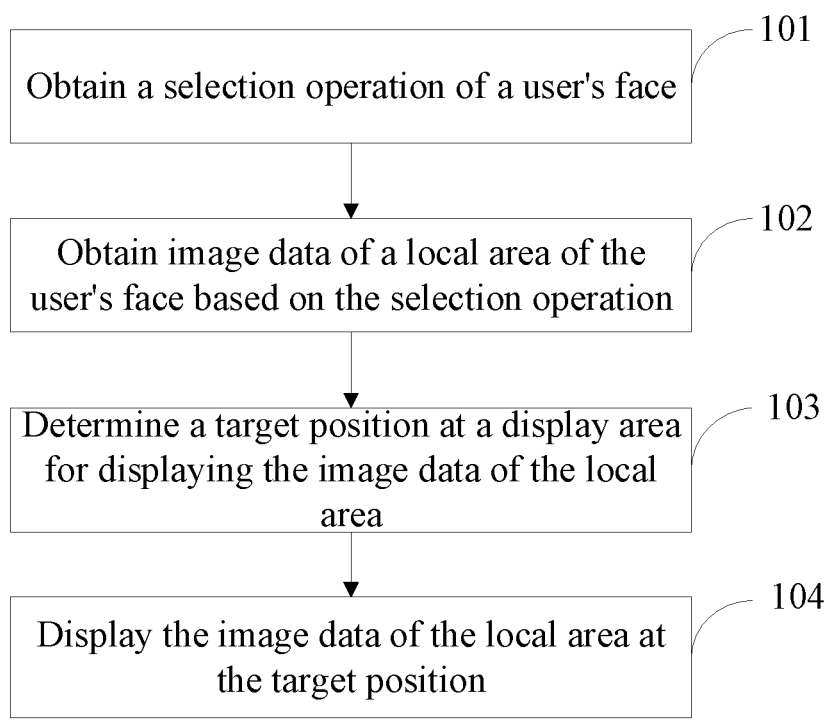
FIG. 2 is a flowchart of a display method according to an embodiment of the disclosure.

FIG. 2 is a flowchart of a display method according to an embodiment of the disclosure. At 101, a selection operation of a user's face by the user is obtained. The user's face is displayed at a display area, and the selection operation of the user's face may be for the user's face displayed at the display area. Therefore, obtaining the user's selection operation of the user's face includes obtaining the user's selection operation of the user's face displayed at the display area. The selection operation of the user's face can also be for the real user's face. The real user's face is located outside the display area and the user's face can be captured by a photographing unit to be displayed at the display area.

Figure 3:
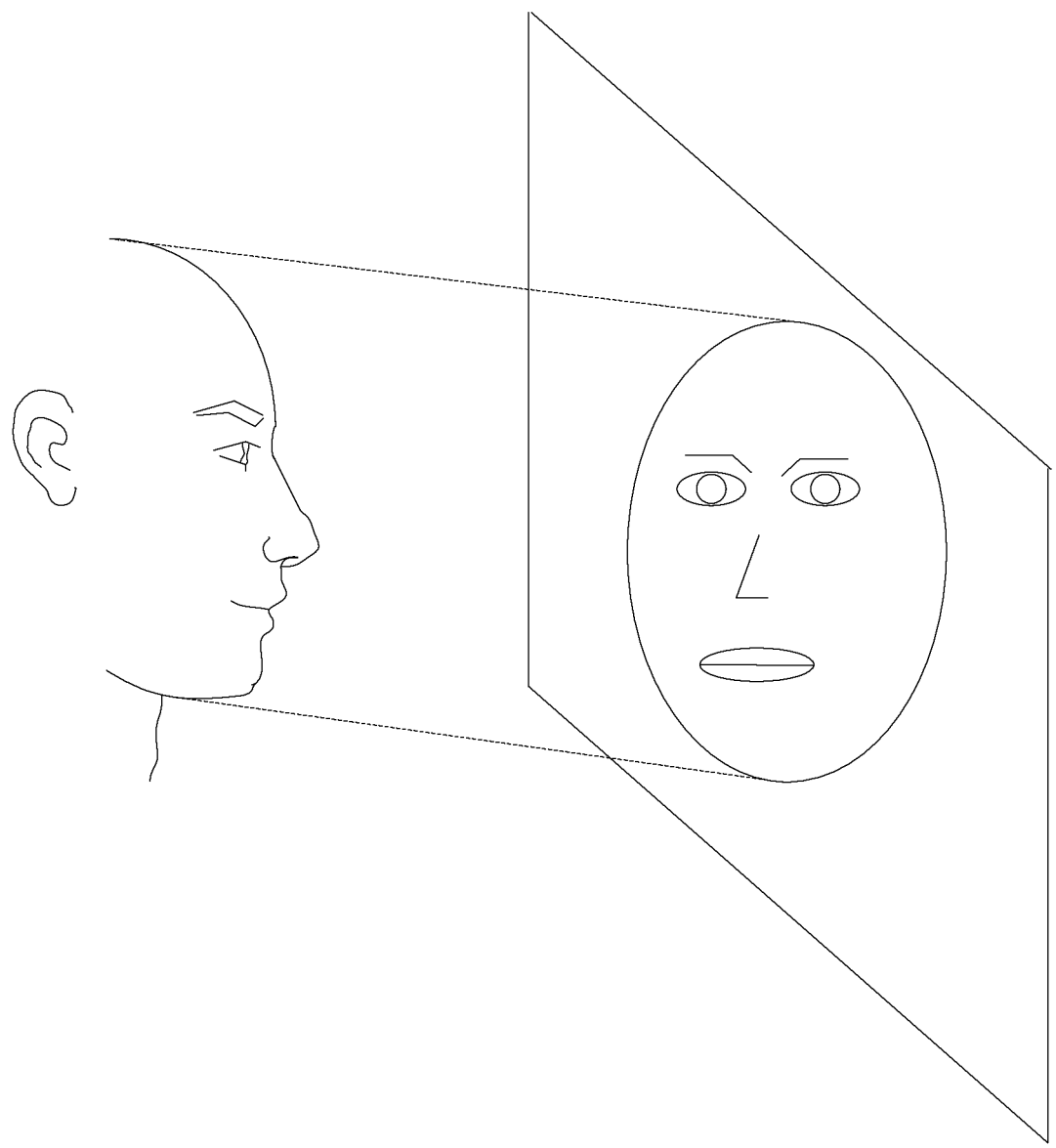
FIG. 3 is a schematic diagram showing a user's face in a real environment and the user's face displayed at a display area according to an embodiment of the disclosure.

For example, the display method provided in the embodiments is applied to an electronic device. A display screen of the electronic device is used as the display area. There is a user in an environment where the electronic device is located. For example, the electronic device is located in a room and there is a user in the room. The user's face of the user (that is, the real user's face) is facing the display area, and the user's face is captured and photographed by a photographing unit of the electronic device for displaying the user's face at the display area, as shown in FIG. 3. If there is a user's face in the real environment, there displays a user's face at the display area. Therefore, obtaining the user's selection operation of the user's face may include, but is not limited to obtaining the user's selection operation of the user's face displayed at the display area, or obtaining the user's selection operation of the real user's face. The selection operation may be at least one of a tap operation, a gesture operation, or a voice operation, which is described in detail in the embodiments.

At 102, image data of a local area of the user's face is obtained based on the selection operation. The local area of the user's face is pointed to by the selection operation, and the image data of the local area can be obtained by a photographing unit shooting, or the image data of the local area pointed to by the selection operation can be extracted by an application from saved image data of the user's face. The image data of the user's face is obtained by the photographing unit and saved before the image data of the local area is obtained. Therefore, the image data of the local area can be obtained from the saved image data using software, without a need to shoot again through the photographing unit.

At 103, a target position at the display area for displaying the image data of the local area is determined. When the user looks at the target position relative to other positions at the display area, the target position causes the local area of the user's face close to a main optical axis of the photographing unit.

In order to make the local area of the user's face close to the main optical axis of the photographing unit when the user looks at the target position, when the image data of the local area is displayed independently at the target position and the local areas is displayed at the user's face, a display relationship between them is a reverse relationship. This reverse relationship is at least a reverse of direction, such as the reverse of left and right, or the reverse of up and down.

For example, if the user's face is divided into an upper half area and a lower half area, the target position is below the display area for the upper half area, and the target position is above the display area for the lower half area. If the user's face is divided into a left half area and a right half area, the target position is to the right of the display area for the left half area, and the target position is to the left of the display area for the right half area.

Figure 4:
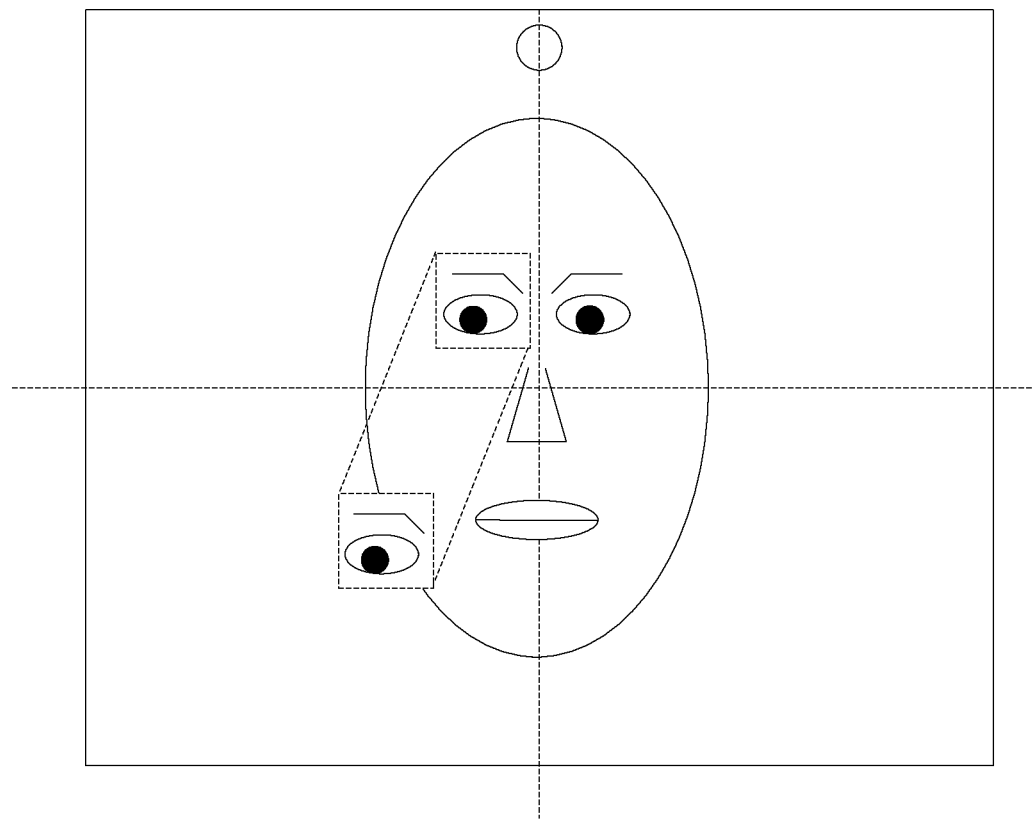
FIGS. 4-6 are schematic diagrams showing three types of target positions where a user's left eye is displayed independently according to embodiments of the disclosure.
Figure 5:
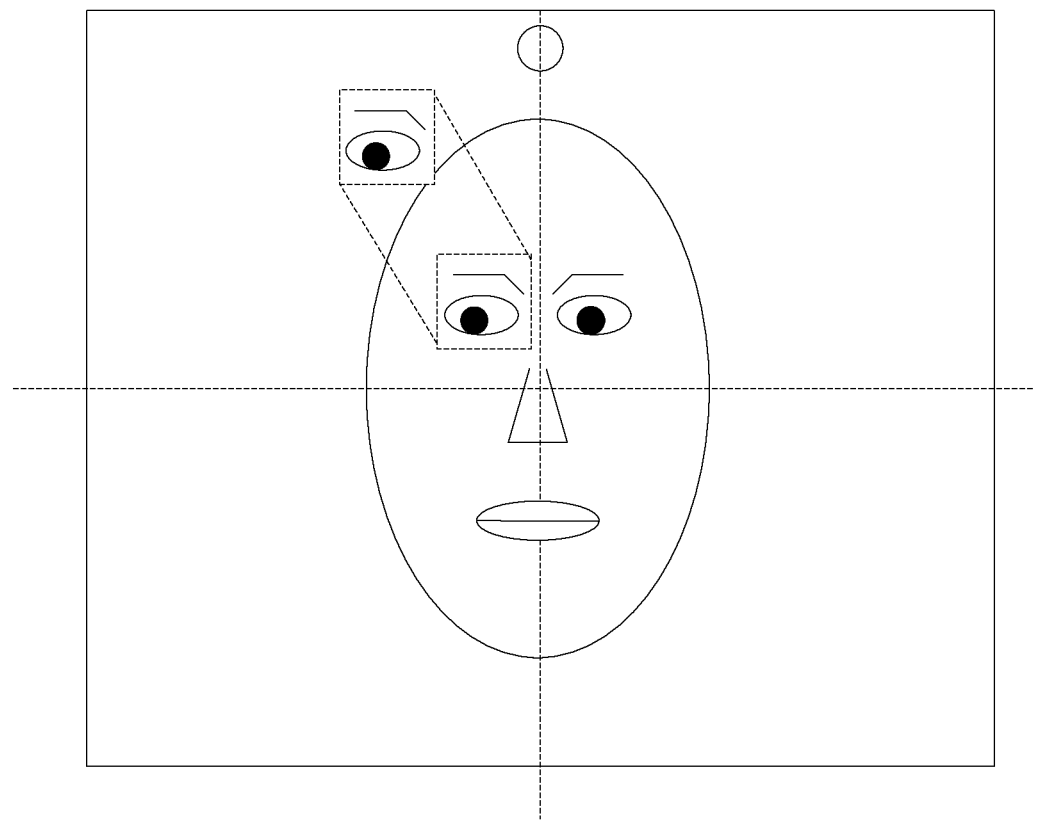
Figure 6:
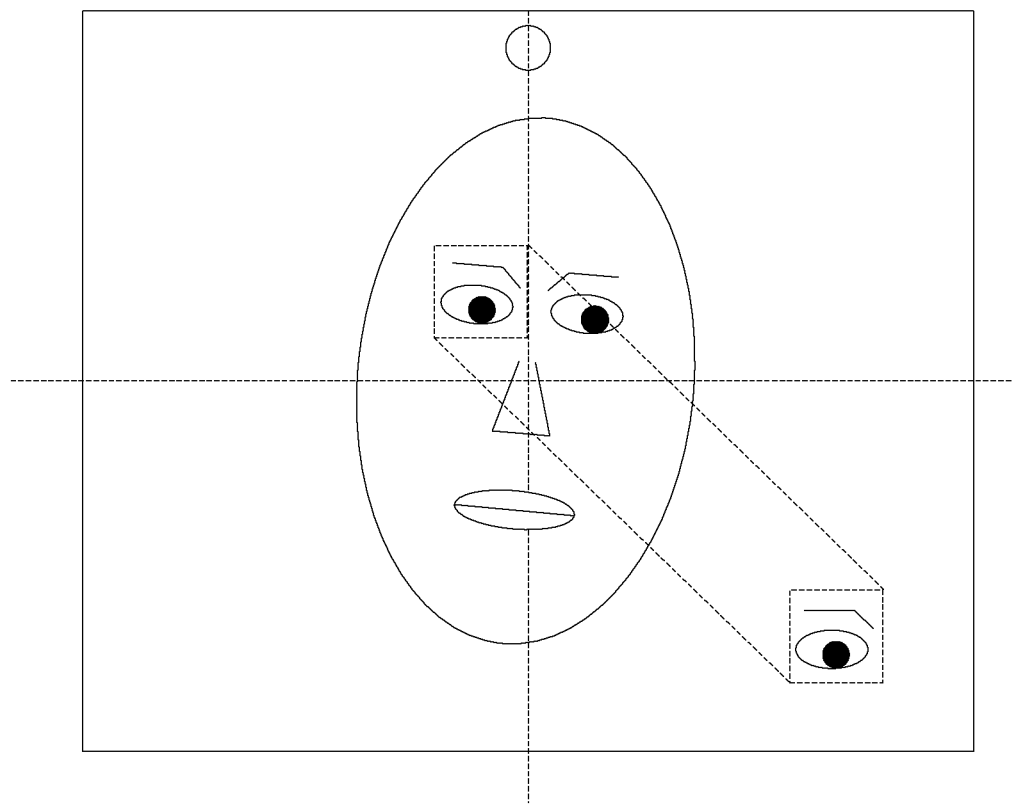

If the user's face is divided into four areas of an upper left area, an upper right area, a lower left area, and a lower right area, a reverse relationship of any area may be a reverse of at least one direction, but it needs to be satisfied that when the user looks at the target position relative to other positions at the display area, the target position causes the local area of the user's face close to the main optical axis of the photographing unit. The user's left eye is taken as an example. When the left eye is displayed independently, the target position can be any one as shown in FIGS. 4-6, such as the lower left as shown in FIG. 4, the upper left as shown in FIG. 5, or the lower right shown in FIG. 6. It is convenient for the user to watch when the left eye is displayed at these target positions, especially when it is displayed at the lower right.

Figure 7:
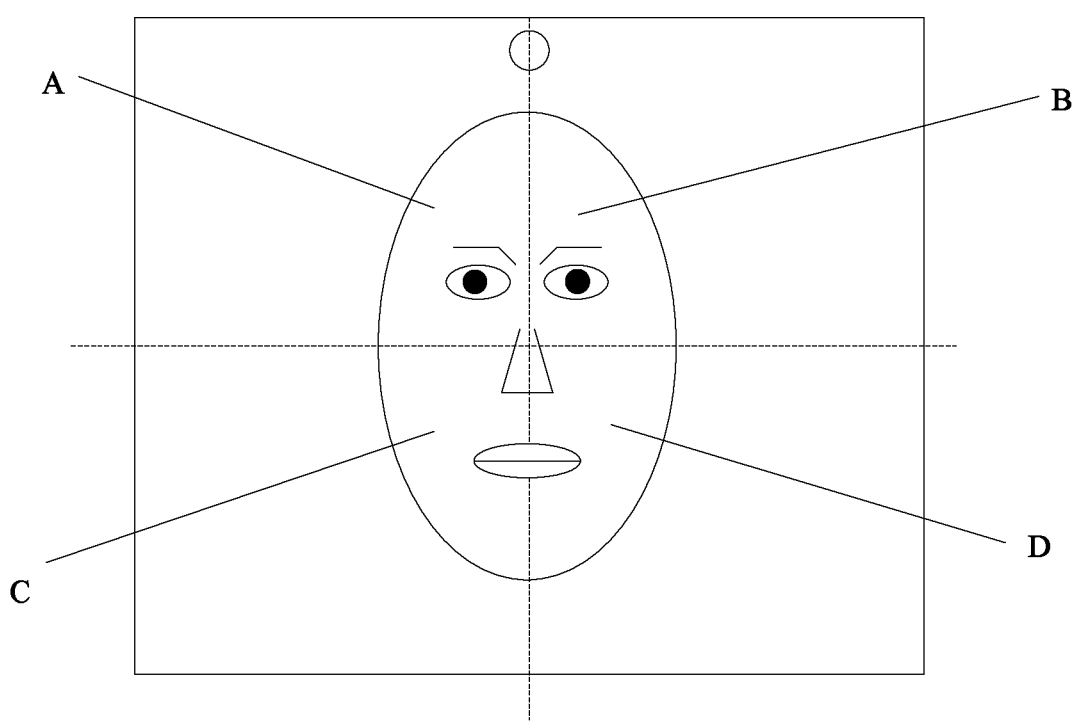
FIG. 7 is a schematic diagram showing another target position according to an embodiment of the disclosure.

In some embodiments, when the local area of the user's face is displayed independently, the target position and the local area at the user's face can be in a diagonal relationship (an absolute direction). As shown in FIG. 7, the user's face is divided into four local areas, namely an upper left area of the user's face (marked as A), an upper right area of the user's face (marked as B), a lower left area of the user's face (marked as C), and a lower right area of the user's face (marked as D).

For the above four local areas, a target position corresponding to the upper left area of the user's face is a lower right area of the display area, a target position corresponding to the upper right area of the user's face is a lower left area of the display area, a target position corresponding to the lower left area of the user's face is an upper right area of the display area, and a target position corresponding to the lower right area of the user's face is an upper left area of the display area. For a local area, the target position corresponding to the local area and the local area at the user's face form a target area, as shown by dotted lines in FIG. 7. The target area includes a local area displayed independently and the local area at the user's face, so that the target area is a rectangular area whose boundary is determined by boundaries of the local area at the user's face and the target position, and the local area at the user's face and the target position are in a diagonal relationship in the target area. This diagonal relationship makes a relationship between the local area of the user's face and the main optical axis of the photographing unit unchanged or have a small change when the user looks at the target position, so that the user's face in the real environment can still face the main optical axis of the photographing unit, which reduces the chance of the user's face having distortion. In addition, the local area of the user's face and the target position being in the diagonal relationship in the target area makes it easier for the user to look at the local area at the target position, which is convenient for the user to use.

The foregoing description is based on the three methods of division of the user's face, and other division method may also be used in the actual application process, which is not described in the embodiments.

At 104, the image data of the local area is displayed at the target position. For example, the image data of the local area may be displayed at the target position in a preset size, so that a picture corresponding to the local area is displayed at the target position to show the local area. The preset size can be determined according to the display area and the area occupied by the user's face, so that the user's face and the local area displayed independently do not overlap.

In the above technical solution, after the user's selection operation of the user's face is obtained, based on the selection operation, the image data of the local area of the user's face is obtained, the target position for displaying the image data of the local area at the display area is determined, and the image data of the local area is displayed at the target position. when the user looks at the target position relative to other positions at the display area, the target position causes the local area of the user's face close to the main optical axis of the photographing unit. The closer the local area is to the main optical axis of the photographing unit, the smaller the chance of the local area having distortion is when the photographing unit shoots the local area, so that it is easier for the photographing unit to focus on the local area, and the picture corresponding to the image data of the local area displayed at the target position is clearer and the chance of having distortion is smaller.

Figure 8:
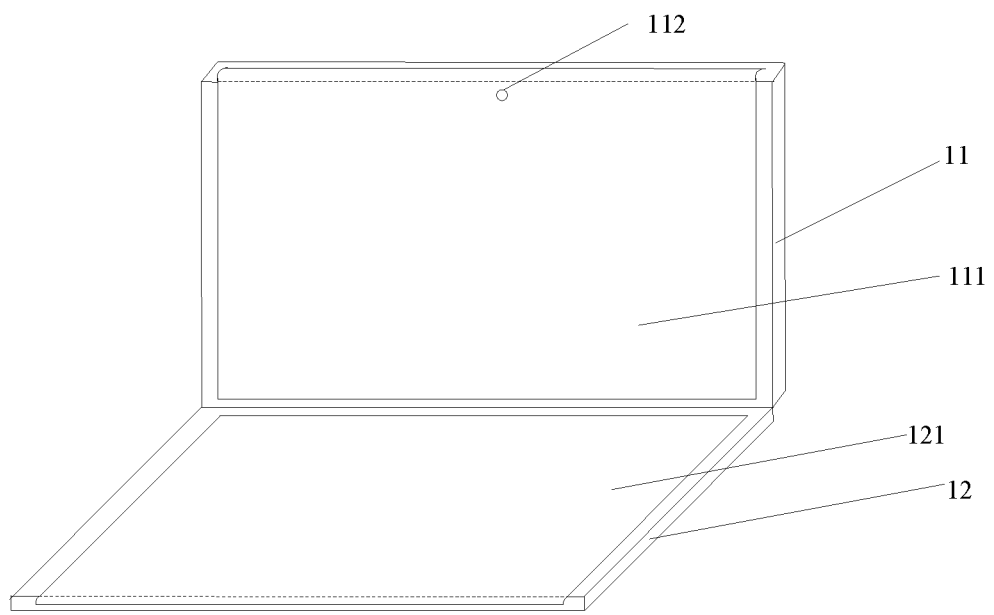
FIG. 8 is a schematic diagram of an electronic device according to an embodiment of the disclosure.

The following two types of electronic devices are used to illustrate the display method provided in the embodiments. FIG. 8 shows a structure of an electronic device according to an embodiment of the present disclosure. The electronic device includes a first body 11 and a second body 12. The first body 11 is provided with a first display screen 111 and a photographing unit 112, and the second body 12 is provided with a second display screen 121. The first display screen 111 and the second display screen 121 can display continuously, for example, the first display screen displays a first part of a first object, the second display screen displays a second part of the first object, and the two parts are continuously and seamlessly displayed. As shown in FIG. 8, a user's face is displayed through the first display screen and the second display screen. The photographing unit 112 is located above the first display screen 111 and away from the second display screen 121. The type of the first display screen and the second display screen is not limited in the embodiments.

When the first body 11 and the second body 12 are in an open state, the first display screen 111 and the second display screen 121 are exposed, as shown in FIG. 8. When the first body 11 and the second body 12 are in a closed state, some of the display area of the first display screen 111 and the second display screen 121 is exposed, and a part of the first display screen and the second display screen are shown outside, so that when the first body 11 and the second body 12 are in the closed state, the exposed area of the first display screen and the second display screen can be used to display, for example, notification messages, incoming call reminders, etc. Whether the first body 11 and the second body 12 are in the open state or the closed state can be determined according to a rotation angle of a shaft between the first body and the second body. An opening angle between the first body and the second body in the open state can be determined according to the rotation angle in the open state.

Figure 9:
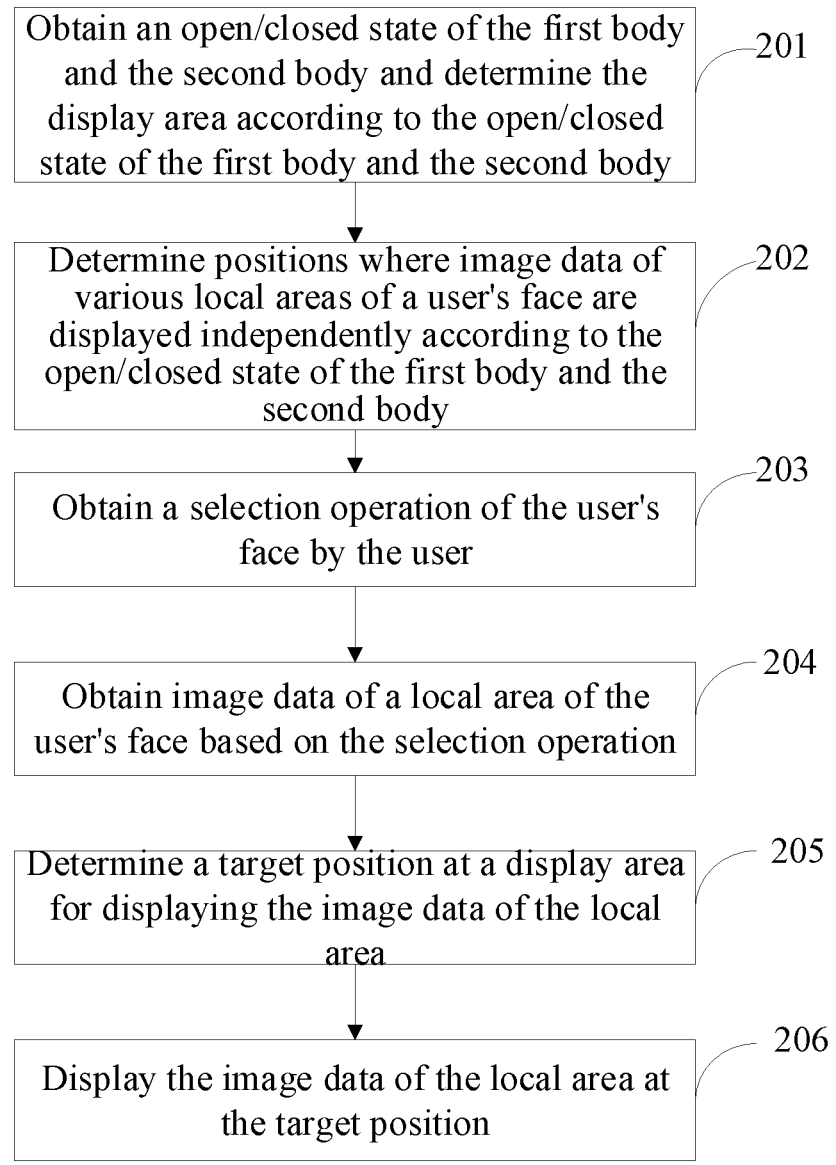
FIG. 9 is a flowchart of another display method according to an embodiment of the disclosure.

Based on the above-described electronic device shown in FIG. 8, FIG. 9 shows a flowchart of another display method according to an embodiment of the present disclosure. At 201, an open/closed state of the first body and the second body is obtained and a display area is determined according to the open/closed state of the first body and the second body. The display area displays at least a local area pointed to by a following selection operation.

In some embodiments, the first body and the second body are each provided with a display screen. A complete object, such as a user's face, can be displayed together by the two display screens, or a complete object can also be displayed by the first display screen out of the two display screens. Whether to use a co-display or a single display depends on a relationship between the first body and the second body, and a process of determining the display area is as follows.

Figure 10:
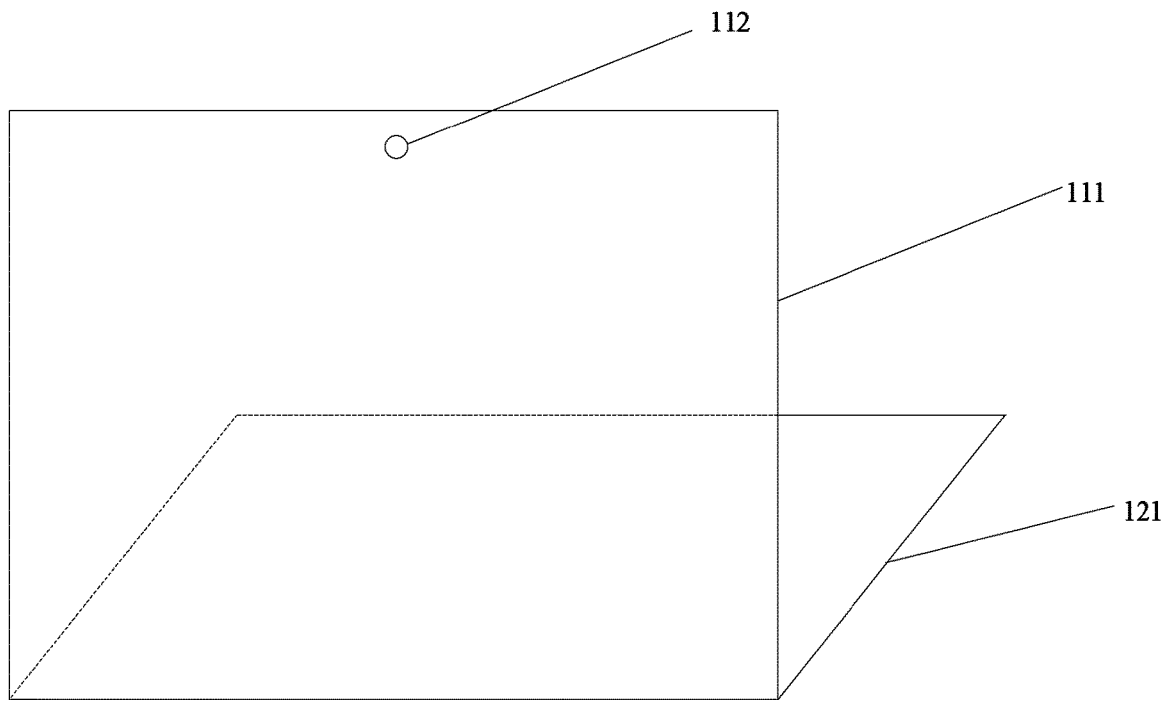
FIG. 10 is a schematic diagram showing an open state of a first body and a second body.

If the open/closed state of the first body and the second body indicates that a display of the first display screen is opposite to a display of the second display screen, the first display screen is determined to be the display area. As shown in FIG. 10, although the first body and the second body are in the open state, the rotation angle of the second body relative to the first body exceeds 180 degrees, which causes the displays of the first display screen and the second display screen to be opposite. In this scenario, the display of one display screen of the first display screen or the second display screen faces the user, and the display of the other display screen faces away from the user. Therefore, only one display screen can be selected as the display area. Because the first display screen and the photographing unit are located at the same body and the photographing unit is needed in the embodiments, the first display screen is used as the display area.

If the open/closed state of the first body and the second body indicates that the display of the first display screen and the display of the second display screen are not opposite, the first display screen and the second display screen are determined to form the display area. As shown in FIG. 8 and compared to what shown in FIG. 10, the first body and the second body are also in the open state, but the first display screen and the second display screen both face the user. Therefore, the first display screen and the second display screen can be used as the display area, that is, the display area includes areas corresponding to the first display screen and the second display screen.

Figure 11:
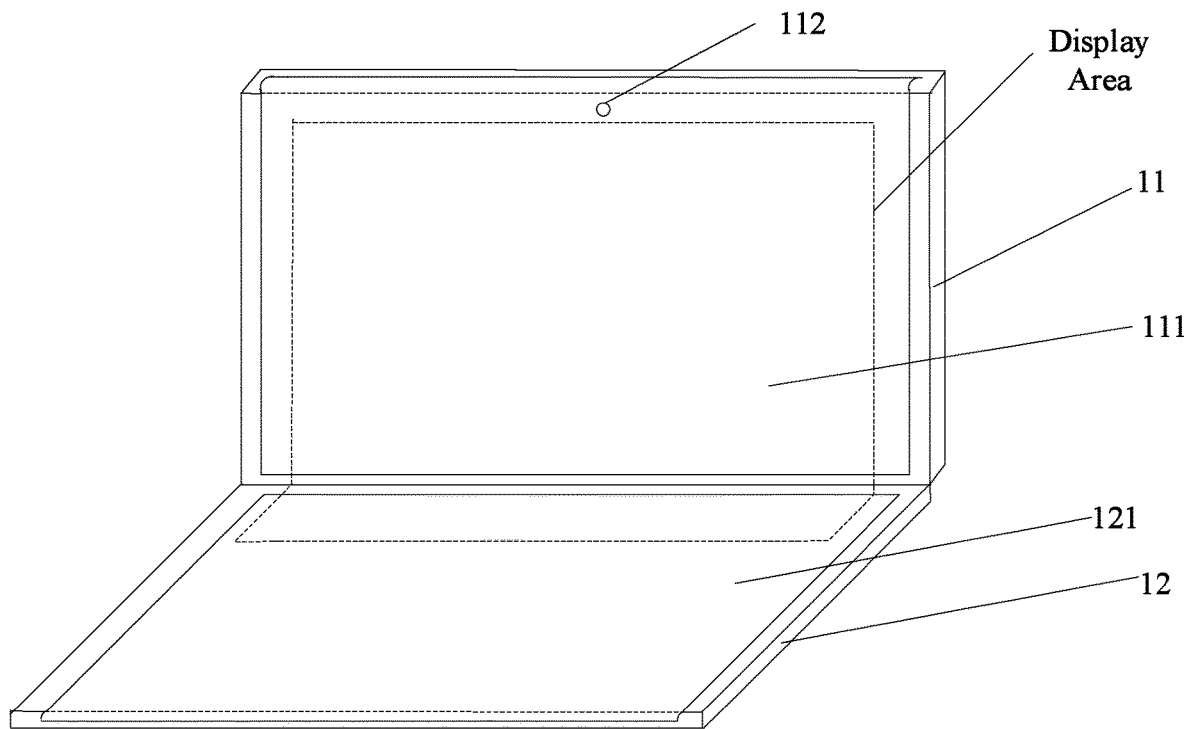
FIG. 11 is a schematic diagram showing a display area according to an embodiment of the disclosure.

In the scenario where the display area includes areas corresponding to the first display screen and the second display screen, a size of the display area can also be adjusted according to the open/closed state of the first body and the second body in the embodiments. For example, if the opening angle between the first body and the second body is smaller than a preset angle, when the user looks at an area at the second display screen and far away from the first display screen, an image captured by the photographing unit is distorted or the user's face cannot be captured. Therefore, the entire area of the first display screen and some area of the second display screen can form the display area, and some area is close to the first display screen, as shown in FIG. 11. If the opening angle between the first body and the second body is greater than a preset angle, when the user looks at any area of the first display screen or the second display screen, the user's face can be captured. The entire area of the first display screen and the entire area of the second display screen can form the display area.

At 202, according to the open/closed state of the first body and the second body, positions where image data of various local areas of the user's face are displayed independently are determined, so as to obtain a target position of image data of a local area pointed to by a selection operation from various positions. The positions where image data of various local areas are displayed independently can all cause the local area of the user's face close to a main optical axis of the photographing unit during a process of independent display when the user looks at the position corresponding to the local area relative to other positions at the display area.

The positions where image data of various local areas of the user's face are displayed independently are also related to the open/closed state of the first body and the second body. The process of determining various positions is as follows. No matter which areas the positions of the various local areas are selected from, a reverse display relationship must be satisfied.

If the open/closed state of the first body and the second body indicates that the display of the first display screen is opposite to the display of the second display screen, the positions where image data of various local areas are displayed independently are selected from all edge areas of the first display screen, as shown in FIG. 7.

If the open/closed state of the first body and the second body indicates that the display of the first display screen and the display of the second display screen are not opposite, and the opening angle between the first body and the second body is smaller than or equal to a preset angle, the positions where the image data of various local areas are displayed independently are selected from an edge area of the second display screen and at least some of the edge area of the first display screen. The edge area of the second display screen is close to the first display screen, and the at least some of the edge area of the first display screen is far away from the second display screen. The preset angle can be adjusted according to actual applications.

Figure 12:
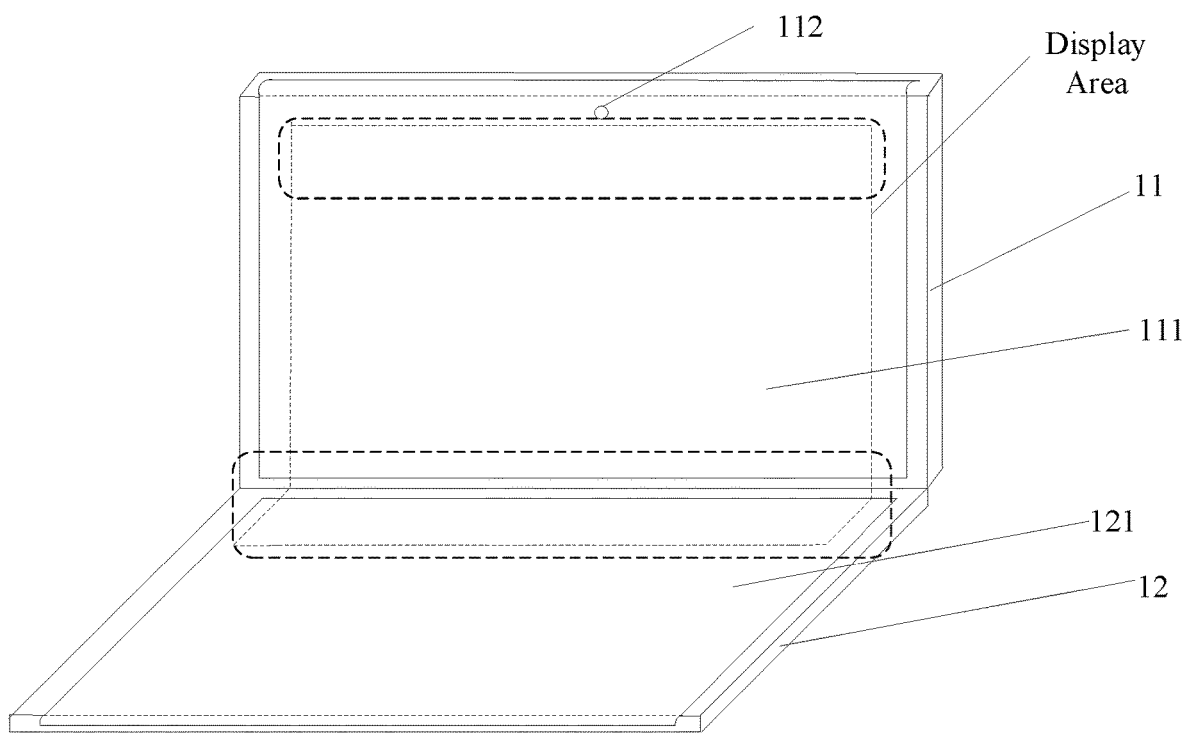
FIGS. 12-14 are schematic diagrams showing selecting positions where image data of various local areas are displayed independently according to embodiments of the disclosure.
Figure 13:
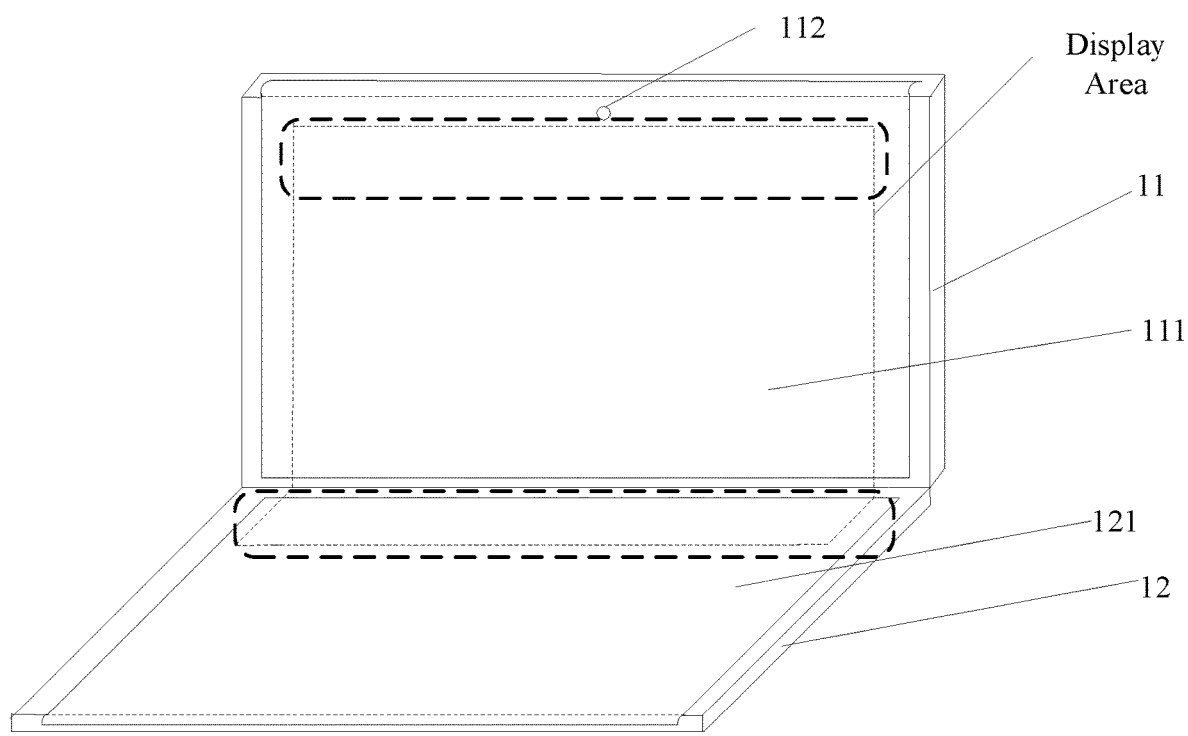

Referring to FIGS. 12 and 13, if the opening angle between the first body and the second body is as shown in FIGS. 12 and 13, the opening angle between the first body and the second body is smaller than the preset angle. As shown in FIG. 12, the positions can be selected from the edge area of the second display screen that is close to the first display screen and all the edge areas of the first display screen (for example, dotted boxes in FIG. 12 are the edge areas for position selection). In a process of displaying an upper half of the user's face with this method, the edge areas of the first display screen and the second display screen are both occupied at the same time. Although the user's face may be blocked, this method can reduce the user's head-down angle during the gaze, and prevent the user's face from not being captured.

In a scenario where the opening angle between the first body and the second body is smaller than the preset angle, the positions corresponding to various local areas can also be determined in the edge area shown as dotted boxes in FIG. 13. Compared to the above FIG. 12, the positions corresponding to various local areas are only selected in the edge area of the first display screen that is far away from the second display screen and the edge area of the second display screen that is close to the first display screen, and the user's face can only be displayed at the first display screen, which can prevent the local area displayed independently from blocking the user's face, however may increase the user's head-down angle during the gaze process. As a result, a certain distortion may occur compared to the above-described FIG. 13.

If the open/closed state of the first body and the second body indicates that the display of the first display screen and the display of the second display screen are not opposite, and the opening angle between the first body and the second body is greater than the preset angle, the positions where the image data of various local areas are displayed independently are selected from a first edge area of the first display screen and a second edge area of the second display screen. The first edge area is far away from the second display screen, and the second edge area is far away from the first display screen.

Figure 14:
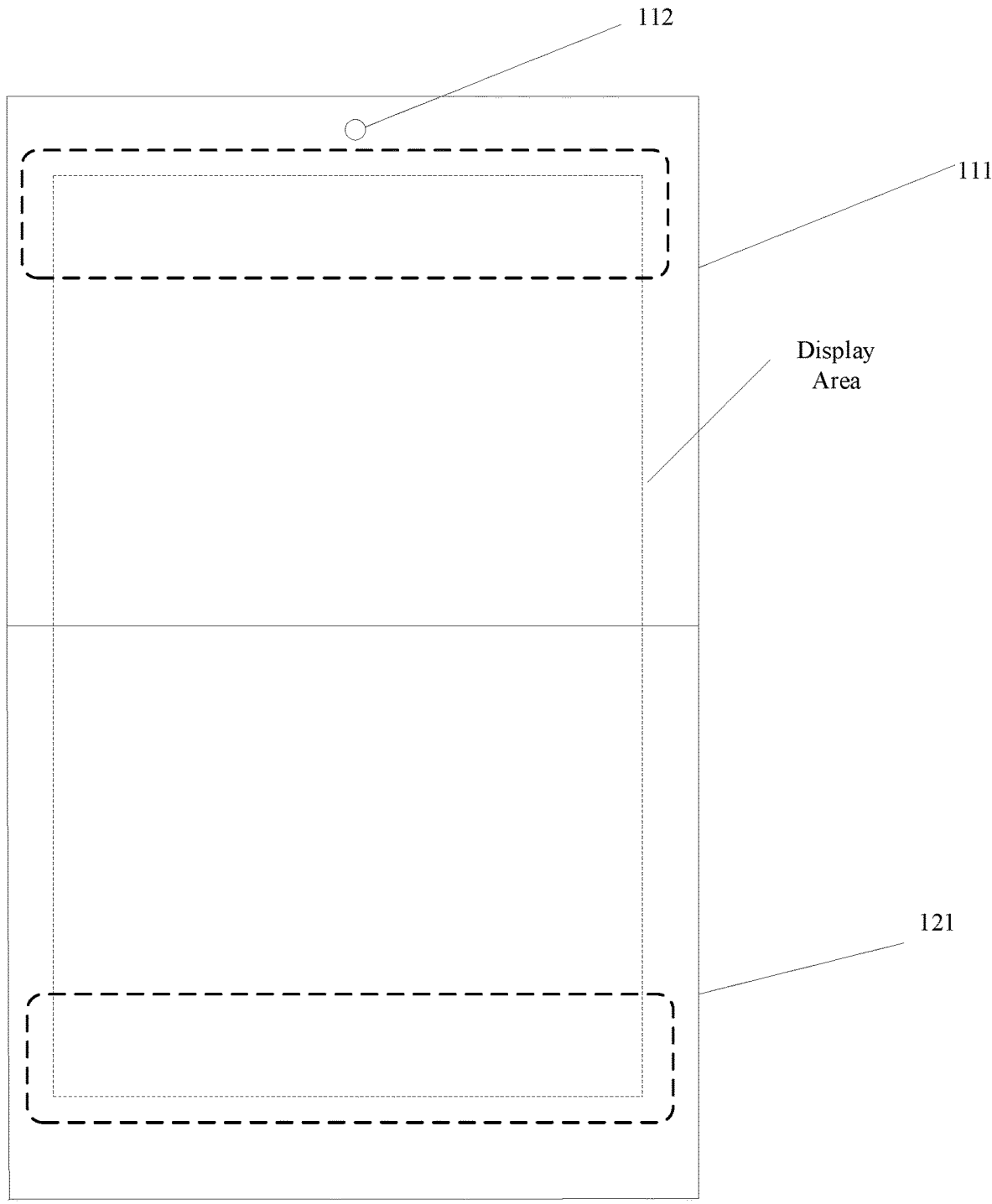

In some embodiments, if the opening angle between the first body and the second body is greater than the preset angle, it means that the first display screen and the second display screen are almost combined into a curved screen or a non-curved display screen. The user's face can be displayed together at the areas of the first display screen and the second display screen, as shown in FIG. 14, and the positions can be selected in the edge area shown by the dotted boxes shown in FIG. 14 to maximize an area of the display area as much as possible, so as to maximize the display of the user's face.

Figure 15:
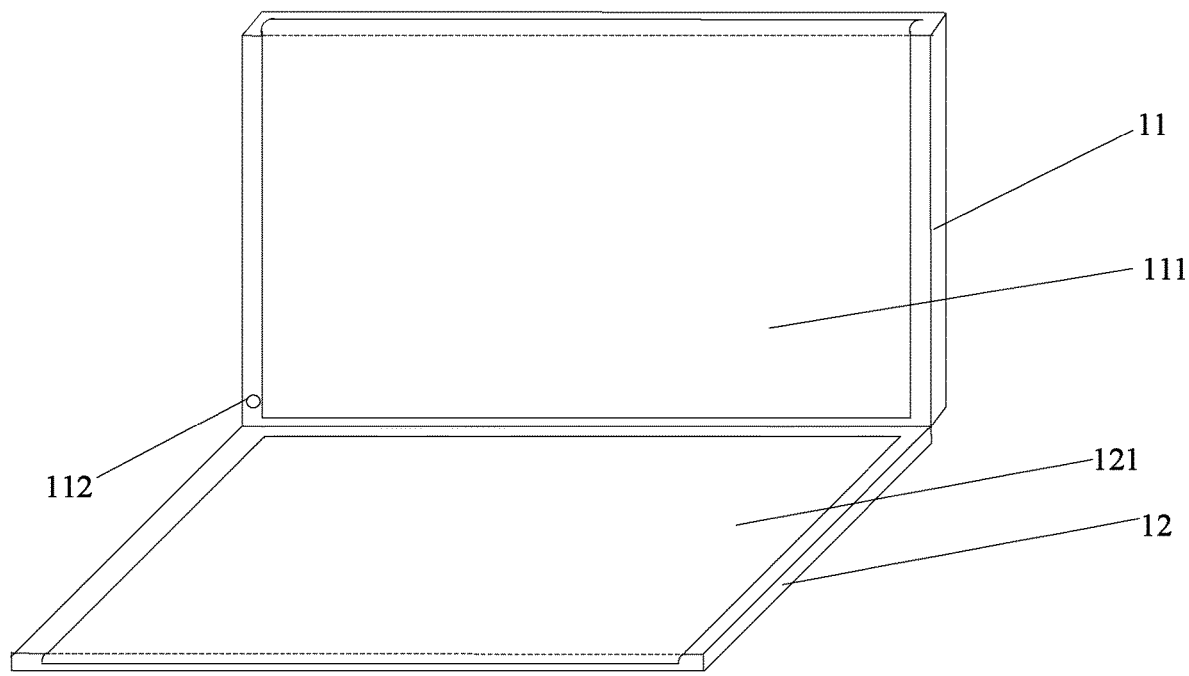
FIG. 15 is a schematic diagram of another electronic device and a location selection according to an embodiment of the disclosure.
Figure 16:
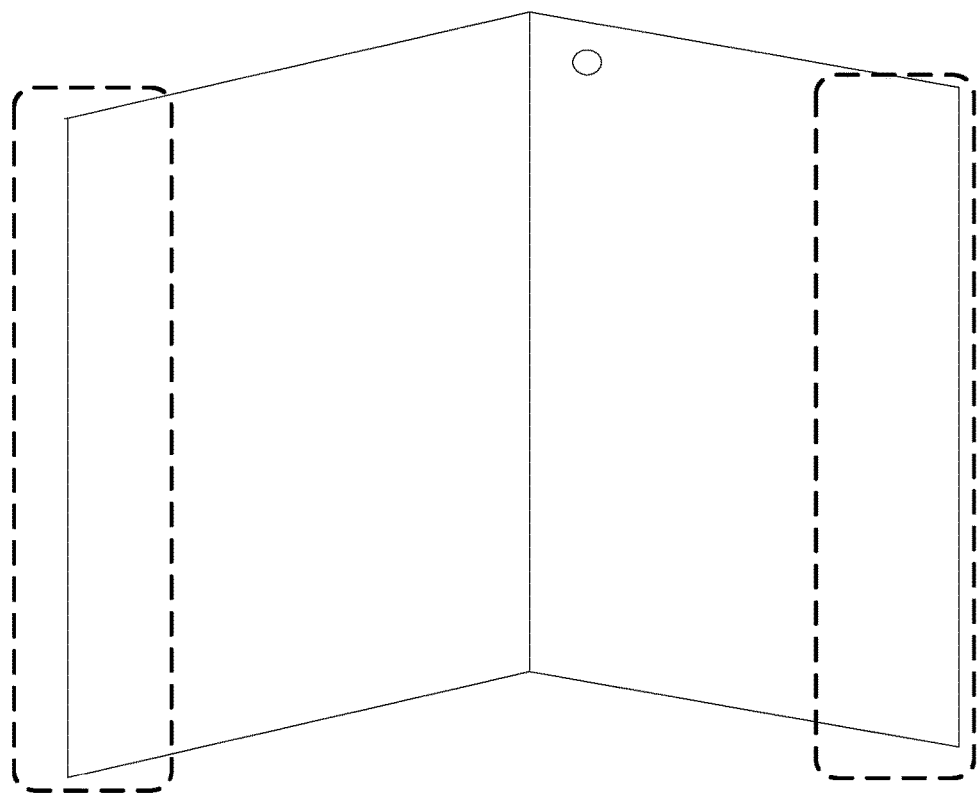
FIGS. 16 and 17 are schematic diagrams of display areas and location selections according to embodiments of the disclosure.
Figure 17:
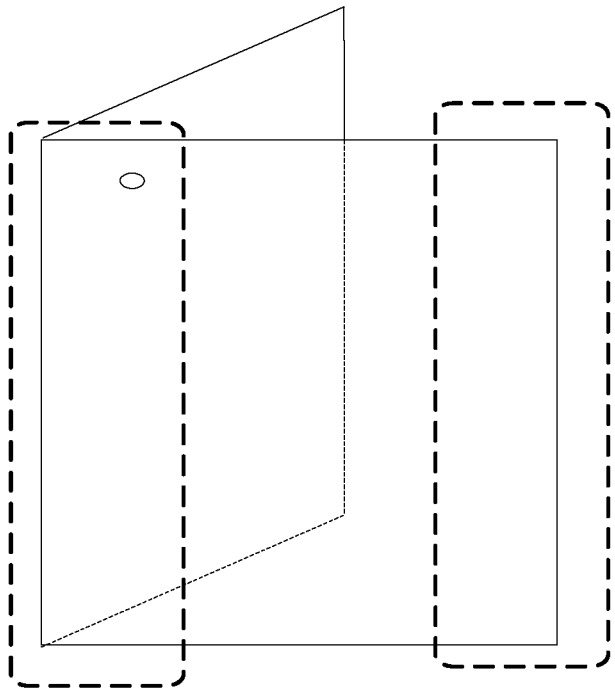

In some embodiments, the photographing unit 112 is located below the first display screen 111 and close to the second display screen 121, as shown in FIG. 15. For an electronic device shown in FIG. 15, the positions where the image data of various local areas and the display area are displayed independently can be determined by referring to the above method. As shown in FIGS. 15-17, FIGS. 15 and 16 illustrate the display area formed by the first display screen and the second display screen, but the edge areas from which the positions where the image data of various local areas are displayed independently are selected in the two views are different. Dotted boxes in FIG. 16 are the areas for position selection. Except for the approach shown in FIG. 16, the position can be selected from the edge area of the second display screen that is close to the first display screen and the edge area of the first display screen that is far away from the second display screen. FIG. 17 shows that the first display screen is used as the display area, and the positions where the image data of various local areas are displayed independently are selected from all the edge areas of the first display screen. Compared with the above-described electronic device shown in FIG. 8, the electronic device shown in FIG. 15 can be placed upright without using other fixing devices, which is convenient to use.

With the display method provided in the embodiments, the display area can also be determined based on the open/closed state of the first body and the second body alone, or the positions where the image data of various local areas of the user's face are displayed independently are determined based on the open/closed state of the first body and the second body alone. The embodiments will not be described with reference to the accompanying drawings.

At 203, a selection operation of a user's face by the user is obtained.

At 204, image data of a local area of the user's face is obtained based on the selection operation.

At 205, a target position at the display area for displaying the image data of the local area is determined. When the user looks at the target position relative to other positions at the display area, the target position causes the local area of the user's face close to a main optical axis of the photographing unit. For example, the target position of the local area pointed to by the selection operation is selected from the positions that are determined at process 202 and at which the image data of various local areas are displayed independently.

At 206, the image data of the local area is displayed at the target position.

With the above technical solutions, display processing can be performed in an electronic device including two display screens. The two display screens are located at different bodies of the electronic device, so that the display area and the edge area for position selection can be adjusted based on the open/closed state of the first body and the second body of the electronic device, which improves the applicability of the method.

Figure 18:
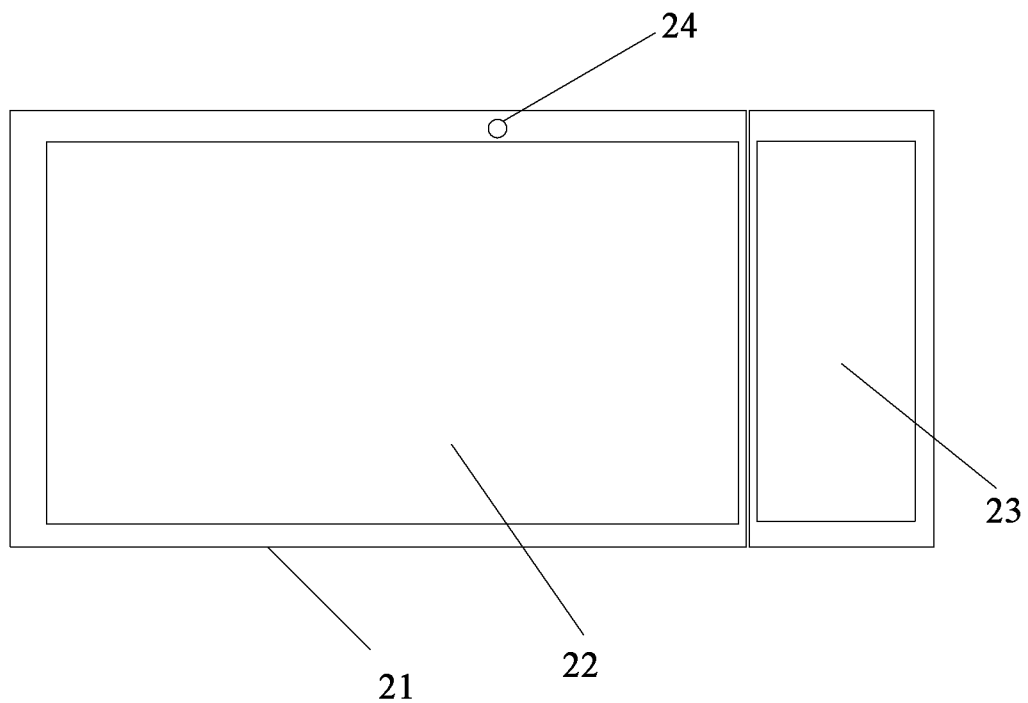
FIG. 18 is a schematic structural diagram of another electronic device according to an embodiment of the disclosure.

The display processing method provided by this embodiment can also be applied to an electronic device shown in FIG. 18. The electronic device shown in FIG. 18 includes a main body 21, a first display screen 22, a second display screen 23, and a photographing unit 24. The first display screen 22 and the photographing unit 24 are disposed at the main body, and the second display screen 23 is connected to the main body. An input identifier (such as a mouse or cursor) displayed at the first display screen 22 can be moved to the right to the second display screen 23, that is, the second display screen 23 is an external expansion screen of the electronic device and the second display screen is located at the right side of the first display screen to expand the display area of the electronic device. The first display screen 22 is used to display the user's face.

Figure 19:
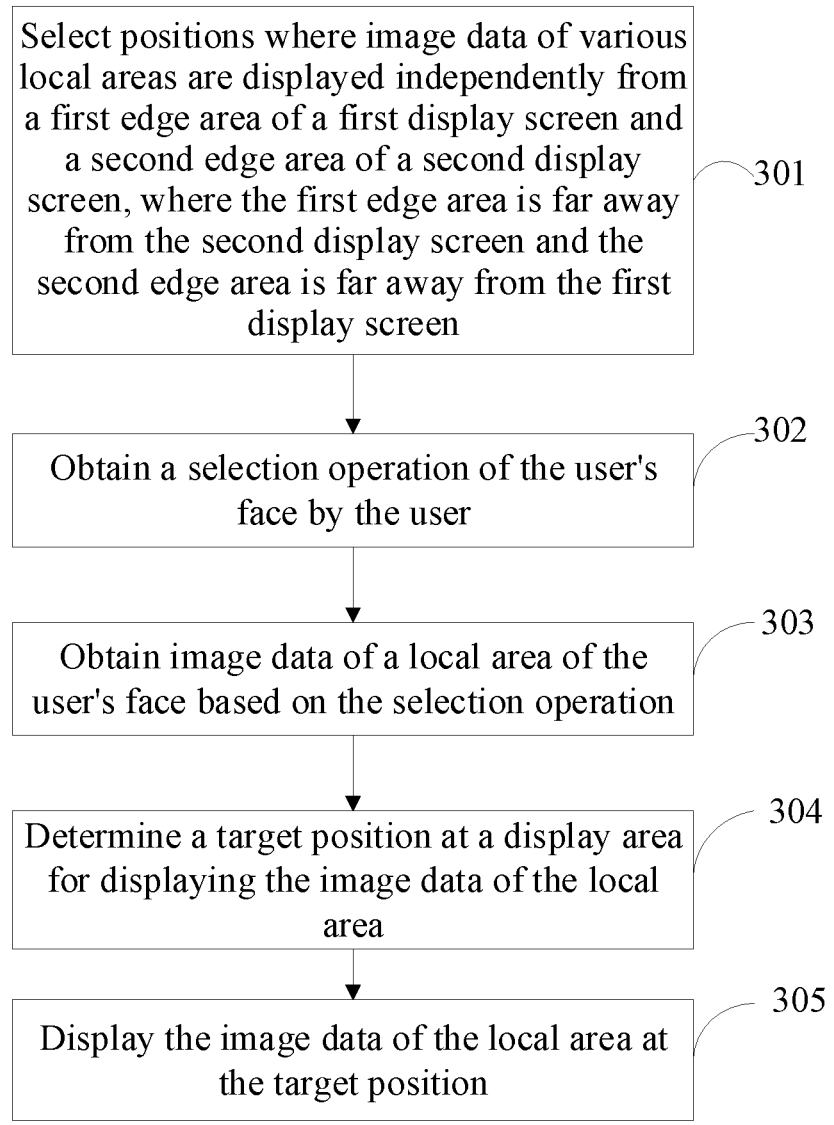
FIG. 19 is a flowchart of another display according to an embodiment of the disclosure.

FIG. 19 shows a flowchart of a display method applied to the electronic device shown in FIG. 18.

At 301, the positions where the image data of various local areas are displayed independently are selected from a first edge area of the first display screen and a second edge area of the second display screen. The first edge area is far away from the second display screen, and the second edge area is far away from the first display screen. The electronic device shown in FIG. 18 is taken as an example. The positions where the image data of various local areas are displayed independently are selected from a left edge area of the first display screen and a left edge area of the second display screen. In the selection process, the positions can also be selected from an area composed of a right edge area of the first display screen and the left edge area of the second display screen. However, this method reduces an area occupied by the user's face.

At 302, a selection operation of a user's face by the user is obtained.

At 303, image data of a local area of the user's face is obtained based on the selection operation.

At 304, a target position at the display area for displaying the image data of the local area is determined. When the user looks at the target position relative to other positions at the display area, the target position causes the local area of the user's face close to a main optical axis of the photographing unit. For example, the target position of the local area pointed to by the selection operation is selected from the positions that are determined at process 301 and at which the image data of various local areas are displayed independently.

At 305, the image data of the local area is displayed at the target position.

With the above technical solutions, display processing can be performed in an electronic device with an external expansion screen. The positions where the image data of various local areas are displayed independently can be selected according to the external expansion screen and the display screen disposed at the body of the electronic device, so that the display method provided in the embodiments can be used in the electronic device with the external expansion screen, which improves the applicability of the method.

Further, the display method according to the embodiments may further include at least one of the following processes.

If a picture corresponding to the image data of the local area displayed at the target position overlaps the display of the user's face, at least one of the picture or the user's face is zoomed and/or moved, so that the user's face and the picture corresponding to the image data of the local area can be displayed simultaneously, and the user's face and the picture corresponding to the image data of the local area can be independent of each other without affecting each other. Therefore, the user can view both the user's face and the picture of the local area displayed independently. If the picture is moved, the picture is moved horizontally so as to still satisfy a reverse display relationship with respect to the local area in the user's face after the movement.

If an operation instruction for the picture corresponding to the image data of the local area is received, the operation corresponding to the operation instruction is performed on the picture. The operation instruction for the picture can be a zoom instruction, and the picture can be zoomed in or out. The zoom instruction can also be used to zoom in or out of the part of the picture corresponding to the operation instruction. The operation instruction for the picture can be an instruction to control the picture to disappear. After the operation instruction is received, the picture corresponding to the image data of the local area can disappear from the display area. Other operation instructions are not described in the embodiments.

The above display method can be applied to makeup-mirror software. After the makeup-mirror software is installed in the electronic device, the electronic device calls the display method provided in the embodiments during a process of running the makeup-mirror software, for example, to display a makeup mirror at the display area. The user's face is displayed at a makeup-mirror interface. When the electronic device detects that the user is applying makeup to a certain local area of the user's face, the image data of the local area will be displayed simultaneously and independently at the display area, so that the user can see an independent picture of this local area. For example, if it is detected that the user is applying makeup on the left eye, image data of the left eye is displayed at the lower right of the display area, and the left eye of the user can even be diagonally opposite to a corresponding target position. In this way, an independent picture of a local area can be displayed independently, and the local area of the user's face can be closer to the main optical axis of the photographing unit when the user looks at the target position corresponding to the local area, which reduces the chance of having distortion.

For the sake of simple description, the foregoing method embodiments are all expressed as combinations of series of actions, but those skilled in the art should know that the present disclosure is not limited by the described sequence of actions. According to the disclosure, some processes can be performed in another order or simultaneously. Further, those skilled in the art should also know that the embodiments described in the disclosure are all preferred embodiments, and the involved actions and modules are not necessarily needed by the disclosure.

Figure 20:
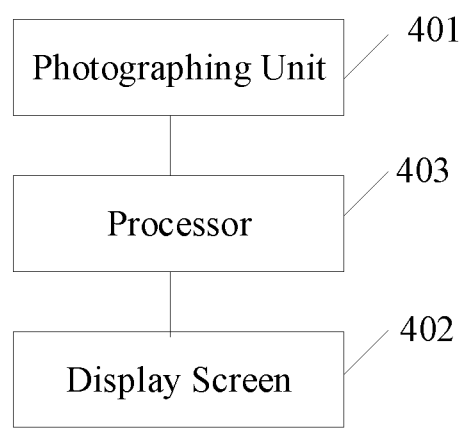
FIG. 20 is a schematic structural diagram of another electronic device according to an embodiment of the disclosure.

Corresponding to the foregoing method embodiments, an electronic device is provided according to the disclosure. As shown in FIG. 20, the electronic device includes a photographing unit 401, a display screen 402, and a processor 403 configured to obtain a selection operation of a user's face by the user, obtain an image of a local area of the user's face based on the selection operation, obtain image data of the local area of the user's face, determine a target position at a display area of the display screen 402 for displaying the image data of the local area, and display the image data of the local area at the target position. When the user looks at the target position relative to other positions at the display area, the target position causes the local area of the user's face close to a main optical axis of the photographing unit 401.

In some embodiments, a relationship between the local area in the user's face and the target position is a diagonal relationship between the local area in the user's face and the target position at a target area. The target area is a rectangle, and a boundary of the target area is determined by boundaries of the local area in the user's face and the target position.

In some embodiments, the electronic device may include a first body and a second body. The display screen 402 includes a first display screen and a second display screen. The first body is provided with the first display screen and the photographing unit. The second body is provided with the second display screen. The first display screen and the second display screen can display continuously.

When the first body and the second body are in an open state, the first display screen and the second display screen are exposed. When the first body and the second body are in a closed state, a part of the display area of the first display screen and the second display screen is exposed.

The processor 403 is further configured to obtain an open/closed state of the first body and the second body, and determine the display area according to the open/closed state of the first body and the second body, and/or the processor 403 is further configured to determine positions where the image data of various local areas of the user's face are displayed independently according to the open/closed state of the first body and the second body, so as to obtain the target position of image data of the local area pointed to by the selection operation from various positions.

The processor determining the display area according to the open/closed state of the first body and the second body includes determining the first display screen as the display area if the open/closed state of the first body and the second body indicates that a display of the first display screen is opposite to a display of the second display screen, and determining that the first display screen and the second display screen form the display area if the open/closed state of the first body and the second body indicates that the display of the first display screen and the display of the second display screen are not opposite.

The processor determining positions where the image data of various local areas of the user's face are displayed independently according to the open/closed state of the first body and the second body includes selecting the positions where the image data of various local areas are displayed independently from all the edge areas of the first display screen if the open/closed state of the first body and the second body indicates that the display of the first display screen is opposite to the display of the second display screen, selecting the positions where the image data of various local areas are displayed independently from an edge area of the second display screen and at least some of the edge area of the first display screen if the open/closed state of the first body and the second body indicates that the display of the first display screen and the display of the second display screen are not opposite and an opening angle between the first body and the second body is smaller than or equal to a preset angle, where the edge area of the second display screen is close to the first display screen and the at least some of the edge area of the first display screen is far away from the second display screen, and selecting the positions where the image data of various local areas are displayed independently from a first edge area of the first display screen and a second edge area of the second display screen if the open/closed state of the first body and the second body indicates that the display of the first display screen and the display of the second display screen are not opposite and the opening angle between the first body and the second body is greater than a preset angle, where the first edge area is far away from the second display screen and the second edge area is far away from the first display screen.

Further, the electronic device may have another structure. For example, the electronic device includes a main body, and the display screen includes a first display screen and a second display screen. The first display screen and the photographing unit are disposed at the main body, and the second display screen is connected to the main body. An input identifier displayed at the first display screen can be moved to the right into the second display screen. The first display screen is used to display the user's face.

The processor is further configured to select the positions where the image data of various local areas are displayed independently from a first edge area of the first display screen and a second edge area of the second display screen. The first edge area is far away from the second display screen, and the second edge area is far away from the first display screen.

For the above electronic device, the processor is further configured to, if a picture corresponding to the image data of the local area displayed at the target position overlaps the display of the user's face, zoom and/or move at least one of the picture or the user's face. If the picture is moved, the picture is moved horizontally.

The processor is further configured to, if an operation instruction for the picture corresponding to the image data of the local area is received, perform an operation corresponding to the operation instruction on the picture.

Various embodiments of the present specification are described in a progressive manner, in which each embodiment focusing on aspects different from other embodiments, and the same and similar parts of each embodiment may be referred to each other. Because the disclosed devices correspond to the disclosed methods, the description of the disclosed devices and the description of the disclosed methods may be read in combination or in separation.

Further, in the present disclosure, relational terms such as first, second, and the like, may be used solely to distinguish one entity or action from another entity or action without necessarily requiring or implying any actual such relationship or order between such entities or actions. The terms "comprises," "includes," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The description of the disclosed embodiments is provided to illustrate the present disclosure to those skilled in the art. Various modifications to these embodiments will be readily apparent to those skilled in the art, and the generic principles determined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosed embodiments in the present disclosure are merely examples for illustrating the general principles of the disclosure. Any equivalent or modification thereof, without departing from the spirit and principle of the present disclosure, falls within the true scope of the present disclosure.

What is claimed is:

1. A display method, comprising:
obtaining a selection operation of a user's face displayed on an electronic device having a photographing unit;
obtaining image data of a local area of the user's face corresponding to the selection operation;
determining a target position at a display area for displaying the image data of the local area; and
displaying the image data of the local area at the target position, wherein:
the local area in the user's face and the target position are in a diagonal relationship at the display area to cause the local area of the user's face to be close to a main optical axis of the photographing unit when the user looks at the target position at the display area,
the image data of the local area is not adjusted, and
different target positions are determined and used for displaying corresponding image data of corresponding local areas, based on the diagonal relationship, for different local areas.

2. The display method according to claim 1, wherein:
the local area in the user's face and the target position are in the diagonal relationship at a target area of the display area, the target area is a rectangle, and a boundary of the target area is determined by boundaries between the local area on the user's face and the target position.

3. The display method according to claim 1, wherein:
an electronic device executing the display method includes a first body and a second body, the first body is provided with a first display screen and the photographing unit, the second body is provided with a second display screen, and the first display screen and the second display screen can display continuously; and
when the first body and the second body are in an open state, the first display screen and the second display screen are exposed, and when the first body and the second body are in a closed state, a part of the display area of the first display screen and the second display screen is exposed.

4. The display method according to claim 3, further comprising:
obtaining an open/closed state of the first body and the second body and determining the display area according to the open/closed state of the first body and the second body; and
determining positions where the image data of a plurality of local areas of the user's face are displayed independently according to the open/closed state of the first body and the second body to obtain the target position of the image data of the local area selected by the selection operation.

5. The display method according to claim 4, wherein determining the display area according to the open/closed state of the first body and the second body includes:
determining the first display screen as the display area in response to the open/closed state of the first body and the second body indicating that a display of the first display screen is opposite to a display of the second display screen; and
determining that the first display screen and the second display screen form the display area in response to the open/closed state of the first body and the second body indicating that the display of the first display screen and the display of the second display screen are not opposite.

6. The display method according to claim 4, wherein determining positions where the image data of a plurality of local areas of the user's face are displayed independently according to the open/closed state of the first body and the second body includes:
selecting the positions where the image data of the plurality of local areas are displayed independently from all edge areas of the first display screen in response to the open/closed state of the first body and the second body indicating that the display of the first display screen is opposite to the display of the second display screen;
selecting the positions where the image data of the plurality of local areas are displayed independently from an edge area of the second display screen and at least some edge area of the first display screen in response to the open/closed state of the first body and the second body indicating that the display of the first display screen and the display of the second display screen are not opposite and an opening angle between the first body and the second body is smaller than or equal to a preset angle, wherein the edge area of the second display screen is close to the first display screen and the at least some edge area of the first display screen is far away from the second display screen; and
selecting the positions where the image data of the plurality of local areas are displayed independently from a first edge area of the first display screen and a second edge area of the second display screen in response to the open/closed state of the first body and the second body indicating that the display of the first display screen and the display of the second display screen are not opposite and the opening angle between the first body and the second body is greater than a preset angle, wherein the first edge area is far away from the second display screen and the second edge area is far away from the first display screen.

7. The display method according to claim 1, wherein:
an electronic device executing the display method includes a main body, a first display screen, a second display screen, and a photographing unit, the first display screen and the photographing unit are disposed at the main body, the second display screen is connected to the main body, an input identifier displayed at the first display screen can be moved to the right into the second display screen, and the first display screen is used to display the user's face.

8. The display method according to claim 7, further comprising:
selecting positions where image data of the plurality of local areas are displayed independently from a first edge area of the first display screen and a second edge area of the second display screen, wherein the first edge area is far away from the second display screen, and the second edge area is far away from the first display screen.

9. The display method according to claim 1, further comprising:

in response to a picture corresponding to the image data of the local area displayed at the target position overlapping with the display of the user's face, zooming or moving either the picture or the user's face, wherein if the picture is moved, the picture is moved horizontally; and in response to an operation instruction for the picture corresponding to the image data of the local area being received, performing an operation corresponding to the operation instruction on the picture.

10. An electronic device, comprising:
a photographing unit;
a display screen; and
a processor configured to:
    obtain a selection operation of a user's face displayed on the display screen;
    obtain an image of a local area of the user's face corresponding to the selection operation;
    obtain image data of the local area of the user's face;
    determine a target position at a display area of the display screen for displaying the image data of the local area; and
    display the image data of the local area at the target position, wherein:
        the local area in the user's face and the target position are in a diagonal relationship at the display area to cause the local area of the user's face to be close to a main optical axis of the photographing unit when the user looks at the target position at the display area,
        the image data of the local area is not adjusted, and
        different target positions are determined and used for displaying corresponding image data of corresponding local areas, based on the diagonal relationship, for different local areas.

11. A computer readable medium containing program instructions for displaying images, wherein execution of the program instructions by one or more processors of a computer system causes the one or more processors to carry out the steps of:
    obtaining a selection operation of a user's face displayed on the computer system having a photographing unit;
    determining one of an upper left area, an upper right area, a lower left area, and a lower right area of the user's face as a local area corresponding to the selection operation;
    obtaining image data of a local area of the user's face corresponding to the selection operation;
    determining a target position at a display area for displaying the image data of the local area; and
    displaying the image data of the local area at the target position, wherein:
        the local area in the user's face and the target position are in a diagonal relationship at the display area to cause the local area of the user's face to be close to a main optical axis of the photographing unit when the user looks at the target position at the display area,
        the image data of the local area is not adjusted, and
        different target positions are determined and used for displaying corresponding image data of corresponding local areas, based on the diagonal relationship, for different local areas.

12. The computer readable medium according to claim 11, wherein:
    the local area in the user's face and the target position are in the diagonal relationship at a target area of the display area, the target area is a rectangle, and a boundary of the target area is determined by boundaries between the local area on the user's face and the target position.

13. The computer readable medium according to claim 11, wherein:
    an electronic device executing the display method includes a first body and a second body, the first body is provided with a first display screen and the photographing unit, the second body is provided with a second display screen, and the first display screen and the second display screen can display continuously; and
    when the first body and the second body are in an open state, the first display screen and the second display screen are exposed, and when the first body and the second body are in a closed state, a part of the display area of the first display screen and the second display screen is exposed.

14. The computer readable medium according to claim 13, the one or more processors further carrying out the steps of:
    obtaining an open/closed state of the first body and the second body and determining the display area according to the open/closed state of the first body and the second body; and
    determining positions where the image data of a plurality of local areas of the user's face are displayed independently according to the open/closed state of the first body and the second body to obtain the target position of the image data of the local area selected by the selection operation.

15. The computer readable medium according to claim 14, wherein determining the display area according to the open/closed state of the first body and the second body includes:
    determining the first display screen as the display area in response to the open/closed state of the first body and the second body indicating that a display of the first display screen is opposite to a display of the second display screen; and
    determining that the first display screen and the second display screen form the display area in response to the open/closed state of the first body and the second body indicating that the display of the first display screen and the display of the second display screen are not opposite.

16. The computer readable medium according to claim 11, the one or more processors further carrying out the steps of:
    in response to a picture corresponding to the image data of the local area displayed at the target position overlapping with the display of the user's face, zooming or moving either the picture or the user's face, wherein if the picture is moved, the picture is moved horizontally; and
    in response to an operation instruction for the picture corresponding to the image data of the local area being received, performing an operation corresponding to the operation instruction on the picture.

17. The display method according to claim 1, further comprising:
    determining one of an upper left area, an upper right area, a lower left area, and a lower right area of the user's face as the local area corresponding to the selection operation;
    wherein determining the target position at the display area for displaying the image data of the local area includes:

determining the target position to be a lower right area of the display in response to the local area of the user's face being the upper left area of the user's face;

determining the target position to be a lower left area of the display area in response to the local area of the user's face being the upper right area of the user's face;

determining the target position to be an upper right area of the display area in response to the local area of the user face being the lower left area of the user's face; and determining the target position to be an upper left area of the display area in response to local area of the user's face being the lower right area of the user's face.

18. The display method according to claim 1, the diagonal relationship is based on diagonals of the whole display area.

19. The display method according to claim 18, wherein the diagonal relationship between the local area and the target position includes:

the local area in the user's face being closer to one of two eyes of the user's face, and the target position being closer to another one of the two eyes of the user's face.

20. The display method according to claim 1, before obtaining the selection operation, further comprising:

displaying a makeup-mirror interface and displaying, in a real-time manner, the user's face in the makeup-mirror interface while the user uses the makeup-mirror interface as a mirror.

* * * * *